United States Patent
Okamoto et al.

(10) Patent No.: US 10,145,413 B2
(45) Date of Patent: Dec. 4, 2018

(54) COMBINATION BEARING

(71) Applicant: JTEKT CORPORATION, Osaka-shi, Osaka (JP)

(72) Inventors: Daisuke Okamoto, Osaka (JP); Takuya Toda, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/653,841

(22) Filed: Jul. 19, 2017

(65) Prior Publication Data

US 2018/0031034 A1 Feb. 1, 2018

(30) Foreign Application Priority Data

Jul. 27, 2016 (JP) .................. 2016-147086

(51) Int. Cl.
| | |
|---|---|
| *F16C 19/30* | (2006.01) |
| *F16C 19/50* | (2006.01) |
| *F16C 19/22* | (2006.01) |
| *F16C 33/38* | (2006.01) |
| *E21B 4/00* | (2006.01) |
| *F16C 19/18* | (2006.01) |
| *F16C 33/66* | (2006.01) |

(Continued)

(52) U.S. Cl.
CPC .......... *F16C 19/305* (2013.01); *F16C 19/163* (2013.01); *F16C 19/181* (2013.01); *F16C 19/225* (2013.01); *F16C 19/502* (2013.01); *F16C 19/541* (2013.01); *F16C 33/664* (2013.01); *F16C 33/6659* (2013.01); *E21B 4/003* (2013.01); *F16C 2300/02* (2013.01); *F16C 2300/14* (2013.01); *F16C 2352/00* (2013.01)

(58) Field of Classification Search
CPC ...... F16C 19/18; F16C 19/225; F16C 19/305; F16C 19/38; F16C 19/385; F16C 33/3843; F16C 33/32; F16C 33/605; F16C 33/40; F16C 2300/14; F16C 2352/00; F16C 2240/46; F16C 2240/70; F16C 2300/02; F16C 19/181; F16C 33/405; E21B 4/003
USPC ... 384/91, 95, 490, 504, 512–513, 516, 519, 384/523, 528, 614, 619
See application file for complete search history.

(56) References Cited

U.S. PATENT DOCUMENTS

| | | | | |
|---|---|---|---|---|
| 1,325,113 | A * | 12/1919 | Rohn ................... | F16C 19/182 384/512 |
| 4,324,444 | A * | 4/1982 | Buczynski .......... | F16C 33/3806 384/526 |

(Continued)

FOREIGN PATENT DOCUMENTS

| | | | | |
|---|---|---|---|---|
| CA | 2397335 A1 * | 2/2004 | ............ | E21B 4/003 |
| DE | 102012217506 A1 * | 3/2014 | ............ | F16C 19/225 |

(Continued)

*Primary Examiner* — Marcus Charles
(74) *Attorney, Agent, or Firm* — Oliff PLC

(57) ABSTRACT

Rolling bearings are stacked with their center lines extending in a vertical direction. Each of the rolling bearings has an inner ring, an outer ring, a plurality of balls, and an annular cage. Each of the rolling bearings has a structure that induces, upon rotation, an action that causes lubricating oil to flow upward along the outer ring in the annular space. The cage has an annular portion provided adjacently below the balls to prevent air from moving to the outer ring side from the inner ring side.

9 Claims, 5 Drawing Sheets

(51) Int. Cl.
*F16C 19/16* (2006.01)
*F16C 19/54* (2006.01)

(56) References Cited

U.S. PATENT DOCUMENTS

| | | | | |
|---|---|---|---|---|
| 4,411,479 A * | 10/1983 | Hirata | ................ | B60B 27/0005 384/504 |
| 4,501,454 A * | 2/1985 | Dennis | ................ | E21B 4/003 384/619 |
| 4,582,169 A * | 4/1986 | Alvis | ................ | F16N 37/003 184/105.3 |
| 5,951,173 A * | 9/1999 | Matsui | ................ | F16C 19/163 384/450 |
| 7,059,777 B2 * | 6/2006 | Kawaguchi | ............ | F16C 19/182 29/898.06 |
| 7,246,947 B2 * | 7/2007 | Thompson | ............ | F16C 19/163 384/516 |
| 7,597,482 B2 * | 10/2009 | Fukuda | ................ | F16C 19/182 384/504 |
| 7,828,483 B2 * | 11/2010 | Fukuda | ................ | F16C 33/3856 384/448 |
| 8,021,053 B2 * | 9/2011 | Habibvand | ......... | F16C 33/3706 384/521 |
| 2006/0193546 A1 * | 8/2006 | Thompson | ............... | F16C 19/52 384/513 |
| 2007/0242913 A1 | 10/2007 | Kawaguchi | | |
| 2008/0031560 A1 * | 2/2008 | Fukuda | ................ | F16C 33/3856 384/512 |
| 2014/0219599 A1 * | 8/2014 | Kurokawa | ............ | F16C 33/585 384/495 |
| 2015/0198202 A1 * | 7/2015 | Murata | ................ | F16C 33/366 384/571 |

FOREIGN PATENT DOCUMENTS

| | | | | |
|---|---|---|---|---|
| EP | 1754902 A2 * | 2/2007 | ............ | F16C 19/225 |
| GB | 353787 A * | 7/1931 | ............ | F16C 19/225 |
| JP | 2005083467 A * | 3/2005 | ............ | F16C 19/225 |
| JP | 2007-263266 A | 10/2007 | | |
| WO | WO 0121970 A1 * | 3/2001 | ............ | F16C 19/163 |

* cited by examiner

PRIOR ART

COMBINATION BEARING

INCORPORATION BY REFERENCE

The disclosure of Japanese Patent Application No. 2016-147086 filed on Jul. 27, 2016 including the specification, drawings and abstract, is incorporated herein by reference in its entirety.

BACKGROUND OF THE INVENTION

1. Field of the Invention

The invention relates to a combination bearing including a plurality of rolling bearings stacked with their center lines extending in a vertical direction.

2. Description of Related Art

A rotation shaft of a sprinkler, for example, as illustrated in FIG. 5, is supported by a combination bearing 90 in which a plurality of rolling bearings 91 are vertically stacked. Lubricating oil (oil) Q is stored in a bottom portion of a bearing housing 98. Some rolling bearings 91, 91 (the lower two in the case of FIG. 5) of the plurality of rolling bearings 91 are immersed in the lubricating oil.

Each of the rolling bearings 91 illustrated in FIG. 5 is an angular contact ball bearing. The angular contact ball bearing, upon rotation, exerts an action (pumping action) that causes the lubricating oil to flow from one axial side to another in an annular space 94 between an inner ring 92 and an outer ring 93 (see, for example, Japanese Patent Application Publication No. 2007-263266 (JP 2007-263266 A)). The plurality of rolling bearings 91 are arranged so that the lubricating oil flows in an upward direction due to the pumping action. Thus, when the shaft 99 rotates, the lubricating oil Q stored in the lower portion can be delivered to the upper (third and fourth lowest) rolling bearings 91. As a result, lubricity throughout the combination bearing 90 can be ensured.

When the rolling bearings 91 rotate, the lubricating oil in the annular space 94 moves toward the outer ring 93 due to centrifugal force, and is caused to flow upward along an inner circumferential surface of the outer ring 93 due to the pumping action. Thus, the oil level of the lubricating oil in an inner space 95 between the inner ring 92 and the cage 96 decreases in the second lowest rolling bearing 91, as well as the lowermost rolling bearing 91, both immersed in the lubricating oil while the rolling bearings 91 are not rotating. Instead, air flows into the inner space 95 from upper sides of these rolling bearings 91. The air is more fluid than the lubricating oil. Therefore, if the rotation is continued in this state, the air that has flowed into the inner space 95 in the lowermost rolling bearing 91, for example, moves to the inner circumferential side of the outer ring 93, as indicated by the arrow X in FIG. 5. This causes the air to be mixed into the lubricating oil Q heading upward. If the amount of the air mixed increases, the pumping action weakens, which may prevent the lubricating oil Q from reaching the upper (uppermost or next) rolling bearing 91.

SUMMARY OF THE INVENTION

One object of the present invention is to prevent, in a combination bearing in which a plurality of rolling bearings are vertically stacked, weakening of the action (pumping action) that causes lubricating oil to flow upward based on rotation of each of the rolling bearings.

A combination bearing of the present invention including a plurality of rolling bearings stacked with their center lines extending in a vertical direction, wherein each of the rolling bearings has an inner ring, an outer ring, a plurality of rolling elements provided in an annular space between the inner ring and the outer ring, and an annular cage retaining the plurality of rolling elements, each of the rolling bearings has a structure that induces, upon rotation, an action that causes lubricating oil to flow upward along the outer ring in the annular space, and the cage has upper and lower annular portions provided adjacently above and below the rolling elements to suppress air from moving to the outer ring side from the inner ring side.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
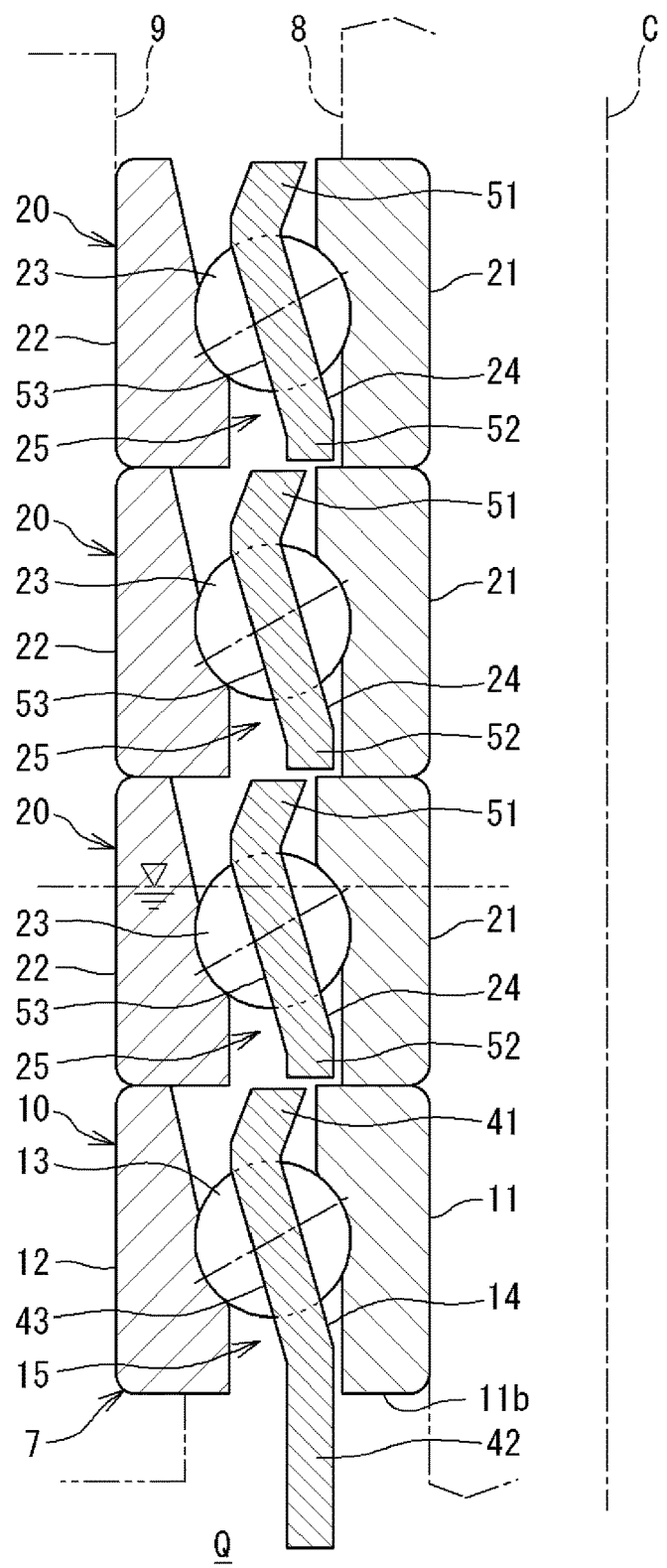
FIG. 1 is a sectional view illustrating one embodiment of a combination bearing of the present invention.

FIG. 1 is a sectional view illustrating one embodiment of a combination bearing of the present invention. A combination bearing 7 illustrated in FIG. 1 has a vertical structure in which a plurality of (four) rolling bearings 10, 20, 20, and 20 are vertically stacked on one another. The rolling bearings 10, 20, 20, and 20 are provided between a shaft 8 and a bearing housing 9 such that their respective center lines C coincide with one another while extending in a vertical direction. The combination bearing 7 is used to support the shaft 8 of a sprinkler, for example.

In the combination bearing 7 illustrated in FIG. 1, the rolling bearings 20 other than the lowermost rolling bearing 10 are identical in structure. Hereinafter, the lowermost rolling bearing 10 will be referred to as a first bearing 10, and the rolling bearings 20 except for the first bearing 10 will be referred to as second bearings 20. Note that the first bearing 10 and the second bearings 20 are identical except that they have different cages 14, 24. In the combination bearing 7, lubricating oil (oil) Q is stored in a bottom portion of the bearing housing 9. While the rotation of the shaft 8 is stopped, rolling bearings 10, 20 (the lower two in the case of FIG. 2) of the four rolling bearings 10, 20, 20, and 20 are immersed in the lubricating oil.

Figure 2:
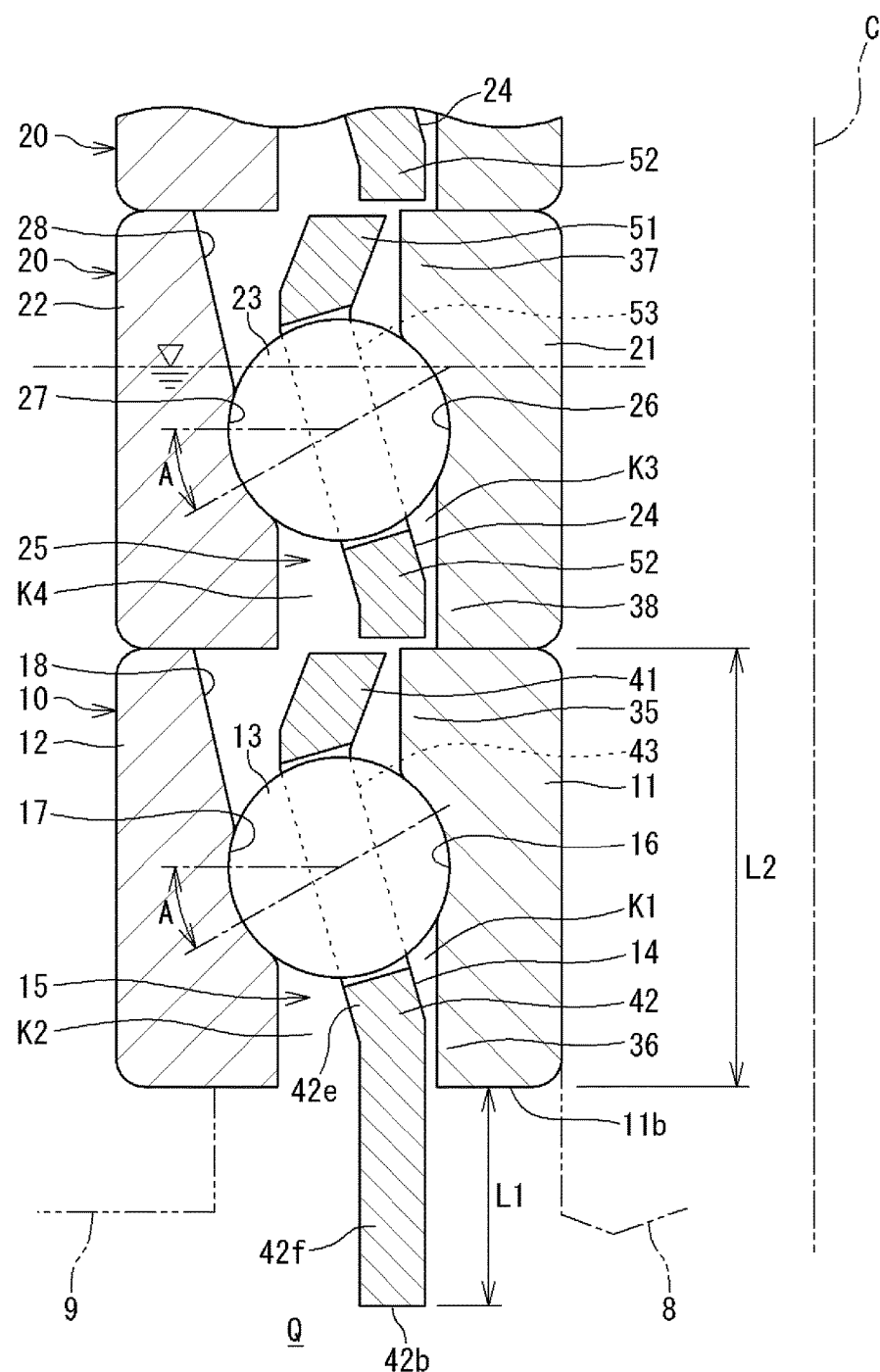
FIG. 2 is a sectional view illustrating the first bearing and the (second lowest) second bearing thereon.

FIG. 2 is a sectional view illustrating the first bearing 10 and the (second lowest) second bearing 20 thereon. The first bearing 10 has an inner ring 11, an outer ring 12, a plurality of balls (rolling elements) 13, and an annular cage 14. The balls 13 are provided in an annular space 15 between the inner ring 11 and the outer ring 12. The cage 14 retains the plurality of balls 13. The inner ring 11 has an inner raceway 16 with which the balls 13 are brought into rolling contact. The outer ring 12 has an outer raceway 17 with which the balls 13 are brought into rolling contact. The first bearing 10 is an angular contact ball bearing. The balls 13 are contacted with the inner raceway 16 and the outer raceway 17 at a contact angle A.

The outer ring 12 has, on an inner circumferential side thereof, a diameter increasing surface 18 that increases in diameter as it extends upward. The diameter increasing surface 18 is connected to and positioned on an upper side of the outer raceway 17. The inner ring 11 has shoulder portions 35, 36 on upper and lower sides of the inner raceway 16. The upper shoulder portion 35 is larger in outside diameter than the lower shoulder portion 36.

The second bearing 20 has an inner ring 21, an outer ring 22, a plurality of balls (rolling elements) 23, and an annular cage 24. The balls 23 are provided in an annular space 25 between the inner ring 21 and the outer ring 22. The cage 24 retains the plurality of balls 23. The inner ring 21 has an inner raceway 26 with which the balls 23 are brought into rolling contact. The outer ring 22 has an outer raceway 27 with which the balls 23 are brought into rolling contact. The second bearing 20 is an angular contact ball bearing. The balls 23 are contacted with the inner raceway 26 and the outer raceway 27 at the contact angle A.

The outer ring 22 has, on an inner circumferential side thereof, a diameter increasing surface 28 that increases in diameter as it extends upward. The diameter increasing surface 28 is connected to and positioned on an upper side of the outer raceway 27. The inner ring 21 has shoulder portions 37, 38 on upper and lower sides of the inner raceway 26. The upper shoulder portion 37 is larger in outside diameter than the lower shoulder portion 38.

Each of the first bearing 10 and the second bearing 20 is an angular contact ball bearing, as described above. The outer rings 12, 22 have the diameter increasing surfaces 18, 28, respectively, that increase in diameter as they extend upward. With this structure, when the first bearing 10 and the second bearing 20 rotate with the shaft 8, an action (pumping action) is induced that causes the lubricating oil Q stored in the bottom portion of the bearing housing 9 to flow upward. When the first bearing 10 and the second bearing 20 rotate, the lubricating oil Q present in the annular spaces 15, 25 is caused to flow upward along an inner circumference surface of each of the outer rings 12, 22, due to centrifugal force.

Due to the pumping action, the lubricating oil Q flows upward along the outer ring 12 in the annular space 15 of the first bearing 10. Then, in the second bearing 20, when the lubricating oil Q flows upward along the outer ring 22 in the annular space 25, the oil level of the lubricating oil Q in inner spaces K1, K3 between the inner rings 11, 21 and the cages 14, 24 decreases compared to the oil level before the rotation. This is because, when flowing upward along the outer rings 12, 22 in outer spaces K2, K4 between the outer rings 12, 22 and the cages 14, 24, the lubricating oil Q in the inner spaces K1, K3 is drawn and supplied into the outer spaces K2, K4.

The cage 14 of the first bearing 10 will now be described. The cage 14 has an upper annular portion 41, a lower annular portion 42, and cage bars 43. The upper annular portion 41 is provided adjacently above the balls 13. The lower annular portion 42 is provided adjacently below the balls 13. The cage bars 43 connect the upper annular portion 41 and the lower annular portion 42. The cage bars 43 are provided at equal intervals along the circumferential direction. A space between the upper annular portion 41 and the lower annular portion 42 and between two cage bars 43 adjacent to each other in the circumferential direction serves as a pocket that houses each ball 13.

In the first bearing 10, as described above, the outer ring 12 has, on the inner circumferential side thereof, the diameter increasing surface 18 that increases in diameter as it extends upward. The outer raceway 17 has a portion that increases in diameter as it extends upward. The cage bars 43 of the cage 14 face part of the diameter increasing surface 18 and the outer raceway 17 shaped to increase in diameter as they extend upward. The cage bars 43 are each inclined radially outward as it extends upward. This structure can prevent the outer space K2 from becoming narrow in the first bearing 10, which allows the pumping action to be effectively achieved.

Figure 5:
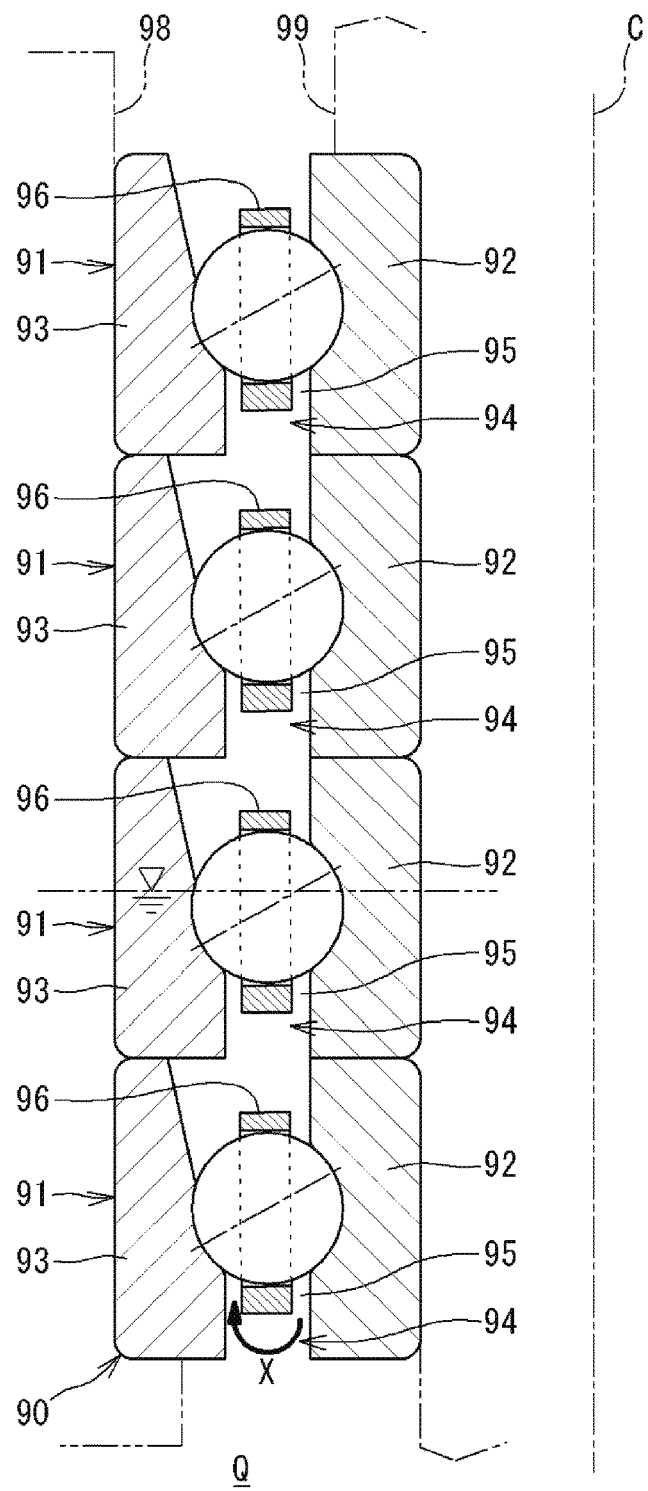
FIG. 5 is a sectional view illustrating a related-art combination bearing.

As illustrated in the related-art example in FIG. 5, when each of the cages 96 has a generally cylindrical shape, particularly the clearance between the lower shoulder portion of the outer ring 93 and the cage 96 is small. This makes it difficult for the lubricating oil Q to enter between the outer ring 93 and the cage 96, which may weaken the induced pumping action. In this embodiment (see FIG. 2), however, the clearance between the lower shoulder portion of the outer ring 12 and the cage 14 is wider (than that in the related-art example). This makes it easy for the lubricating oil Q to enter between the outer ring 12 and the cage 14, which allows the pumping action to be effectively achieved.

The lower annular portion 42 of the cage 14 has a base portion 42e that extends in a direction in which the cage bars 43 extend and an extension portion 42f that further extends downward from the base portion 42e. The lower annular portion 42 extends in the radial direction toward the shoulder portion 36 of the inner ring 11. The extension portion 42f of the lower annular portion 42 extends downward to a position lower than a lower surface 11b of the inner ring 11. The extension portion 42f linearly extends downward, and has a cylindrical shape centered around the center line C. A vertical dimension L1 from the lower surface 11b of the inner ring 11 to a lower end 42b of the lower annular portion 42 can be set to various values (with the proviso that L1>0). For example, the dimension L1 may be set to 30 to 70% of a width dimension (vertical dimension) L2 of the inner ring 11. In the embodiment illustrated in FIG. 2, the dimension L1 is set to 50% of the dimension L2.

The upper annular portion 41 of the cage 14 is bent relative to the direction in which the cage bars 43 extend, and has a tapered shape that decreases in diameter as it extends upward. Thus, the upper annular portion 41 extends in the radial direction toward the shoulder portion 35 of the inner ring 11.

The cage 24 of the second bearing 20 will now be described. The cage 24 has an upper annular portion 51, a lower annular portion 52, and cage bars 53. The upper annular portion 51 is provided adjacently above the balls 23. The lower annular portion 52 is provided adjacently below the balls 23. The cage bars 53 connect the upper annular portion 51 and the lower annular portion 52. The cage bars 53 are provided at equal intervals along the circumferential direction. A space between the upper annular portion 51 and the lower annular portion 52 and between two cage bars 53 adjacent to each other in the circumferential direction serves a pocket that houses each ball 23.

In the second bearing 20, the outer ring 22 has, on the inner circumferential side thereof, the diameter increasing surface 28 that increases in diameter as it extends upward, as described above. The outer raceway 27 has a portion that increases in diameter as it extends upward. The cage bars 53 of the cage 24 face part of the diameter increasing surface 28 and the outer raceway 27 shaped to increase in diameter as they extend upward. The cage bars 53 are each inclined radially outward as it extends upward. This structure can prevent the outer space K4 from becoming narrow in the second bearing 20, which allows the pumping action to be effectively achieved.

The lower annular portion 52 of the cage 24 extends in a direction in which the cage bars 53 extend, and further, extends downward in a short length. The lower annular portion 52 extends in the radial direction toward the shoulder portion 38 of the inner ring 21, and faces (is close to), in the axial direction, the upper shoulder portion 35 of the inner ring 11 of the first bearing 10 positioned under the lower annular portion 52, with a clearance therebetween. The upper annular portion 51 of the cage 24 is bent relative to the direction in which the cage bars 53 extend, and has a tapered shape that decreases in diameter as it extends upward. Thus, the upper annular portion 51 extends in the radial direction toward the shoulder portion 37 of the inner ring 21.

In the combination bearing 7 configured as described above, each of the first bearing 10 and the second bearing 20 has a structure that induces, upon rotation, an action (pumping action) that causes the lubricating oil to flow upward along the outer rings 12, 22 in the annular spaces 15, 25. With such rotation-induced pumping action, it is possible to supply the lubricating oil Q stored in the lower portion of the bearing housing 9 to the third and fourth lowest second bearings 20 as well.

In the lowermost first bearing 10, when the lubricating oil Q flows upward along the outer ring 12 due to the pumping action, the oil level decreases in the inner space K1, and air flows downward into the inner space K1. The air then attempts to move to the outer ring 12 side; however, the lower annular portion 42 of the cage 14 extends downward to a position lower than the lower surface 11b of the inner ring 11 (see FIG. 2). Thus, even if the oil level in the inner space K1 decreases, the air is inhibited from moving to the outer ring 12 side from the inner ring 11 side, which can prevent weakening (reduction) of the pumping action due to the air. Specifically, the lower annular portion 42 of the cage 14 has the function of hindering the air from moving to the outer ring 12 side from the inner ring 11 side.

In the first bearing 10 (second bearing 20), the inner ring 11 (21) has the upper shoulder portion 35 (37) that is larger in outside diameter than the lower shoulder portion 36 (38). In the second lowest second bearing 20, the lower annular portion 52 of the cage 24 faces, in the axial direction, the upper shoulder portion 35 of the inner ring 11 of the first bearing 10 positioned under the lower annular portion 52, with a clearance therebetween. In the third lowest or higher second bearing 20, the lower annular portion 52 of the cage 24 faces, in the axial direction, the upper shoulder portion 37 of the inner ring 21 of the second bearing 20 positioned under the lower annular portion 52, with a clearance therebetween.

Thus, in the second bearing 20, when the lubricating oil Q flows upward along the outer ring 22 due to the pumping action, the oil level decreases in the inner space K3, and air flows downward into the inner space K3. The air then attempts to move to the outer ring 22 side by passing between the first bearing 10 and the second bearing 20 or between the vertically adjacent second bearings 20. Because of the above-described lower annular portion 52, however, the flow path between the lower annular portion 52 and the inner ring 11 (21) positioned adjacently under the lower annular portion 52 is narrow, so the air cannot readily pass through the inner ring 21 side. Thus, the air cannot readily flow from above into the inner ring 21 side. As a result, the air is inhibited from moving to the outer ring 22 side from the inner ring 21 side, which can prevent weakening of the pumping action. Specifically, in the second lowest or higher second bearing 20, the lower annular portion 52 of the cage 24 has the function of hindering the air from moving to the outer ring 12 side from the inner ring 11 side.

In the first bearing 10 (second bearing 20), as described above, the outer ring 12 (22) has, on the inner circumferential side thereof, the diameter increasing surface 18 that increases in diameter as it extends upward. The cage 14 (24) has the cage bars 43 (53) that are inclined radially outward as they extend upward. This prevents the outer space K2 (K4) from becoming narrow, which allows the pumping action to be effectively achieved. Moreover, in the first bearing 10 (second bearing 20), the upper annular portion 41 (51) of the cage 14 (24) has a tapered shape that decreases in diameter as it extends upward.

This structure can provide continuity between the cage 14 of the lowermost first bearing 10 and the cage 24 of the (second lowest) second bearing 20 thereon. Specifically, a structure is obtained in which the inner spaces K1, K3 on the inner rings 11, 21 side and the outer spaces K2, K4 on the outer rings 12, 22 side are divided from each other by the cages 14, 24. This also inhibits air from going around to the outer rings 12, 22 side from the inner rings 11, 21 side between the two bearings 10 and 20, which can prevent weakening of the pumping action. Continuity can be similarly provided between the cage 24 of the second bearing 20 and the cage 24 of the second bearing 20 thereon. Specifically, a structure is obtained in which the inner spaces K3 on the inner rings 21 side and the outer spaces K4 on the outer rings 22 side are divided from each other by the cages 24. This also inhibits air from moving to the outer rings 22 side from the inner rings 21 side between the two, upper and lower bearings 20 and 20, which can prevent weakening of the pumping action. As described above, the flow path in the outer space K2 (K4) through which the lubricating oil Q flows upward and the inner space K1 (K3) into which air enters (flows) can be divided from each other by the cages 14, 24.

Figure 3:
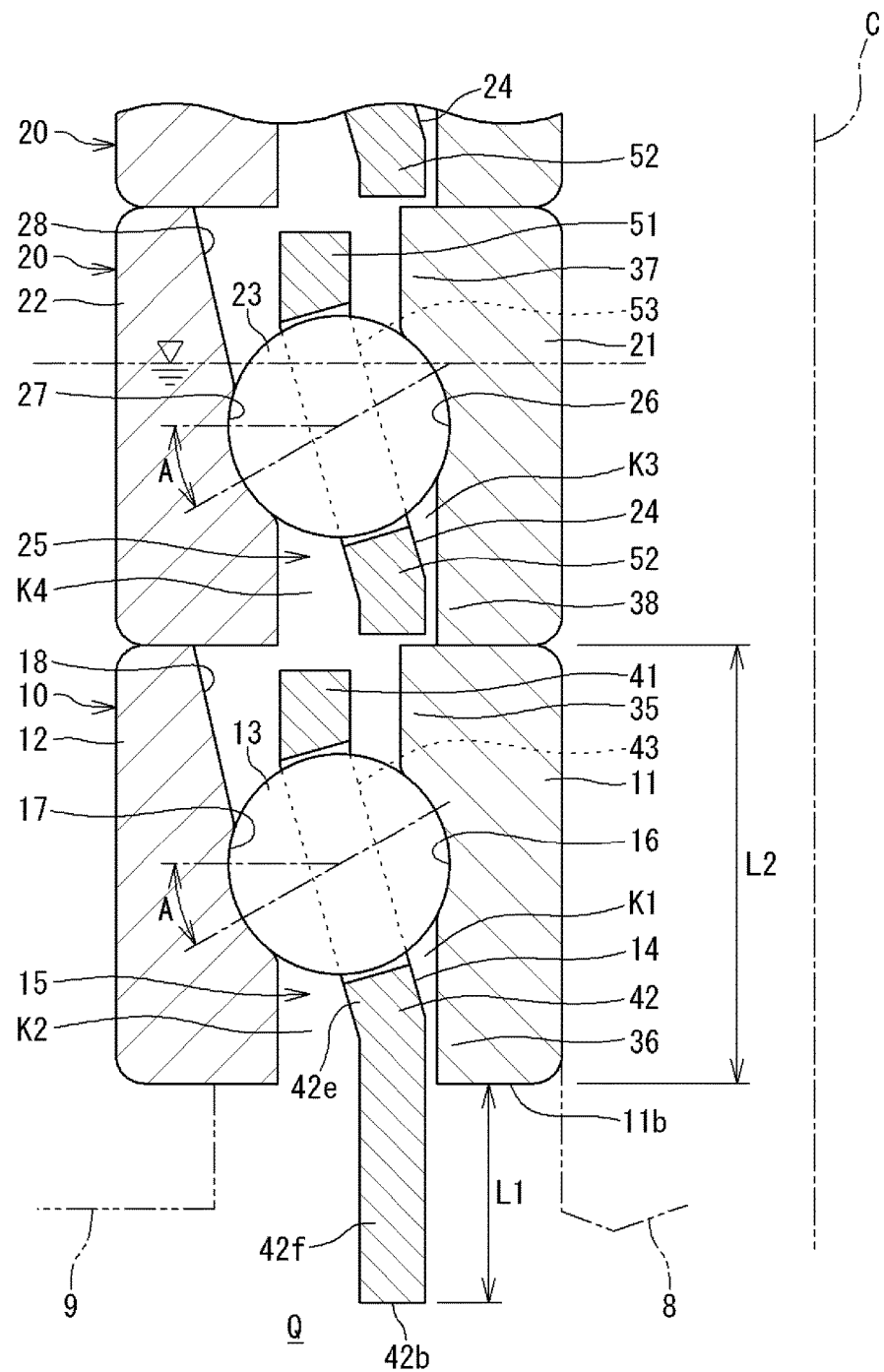
FIG. 3 is a sectional view of a combination bearing having a cage different from the cage illustrated in FIG. 2.

The foregoing embodiment has described the case where the upper annular portion 41 (51) of the cage 14 (24) has a tapered shape that decreases in diameter as it extends upward. As a modification thereof, however, as illustrated in FIG. 3, the upper annular portion 41 (51) of the cage 14 (24) may have a cylindrical shape that is vertically linear.

Figure 4:
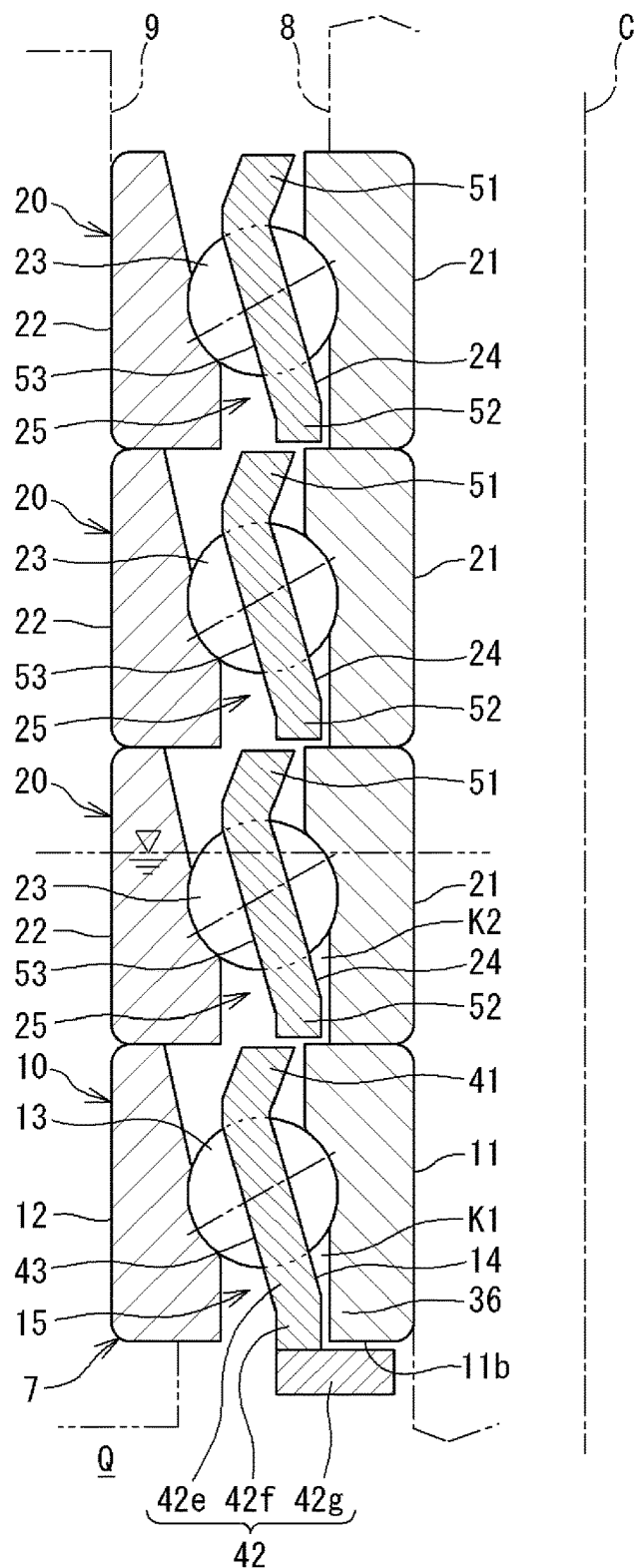
FIG. 4 is a sectional view of a combination bearing that differs in the first bearing.

FIG. 4 is a sectional view of a combination bearing 7 that differs from the combination bearing 7 illustrated in FIG. 1 in the first bearing 10. Second bearings 20 of the combination bearing 7 illustrated in FIG. 4 are identical to the second bearings 20 of the combination bearing 7 illustrated in FIG. 1. The first bearing 10 illustrated in FIG. 4 is identical to the first bearing 10 illustrated in FIG. 1, except that it differs in the cage 14.

In the combination bearing 7 illustrated in FIG. 4, a lower annular portion 42 of the cage 14 of the lowermost first bearing 10 faces a lower surface 11b of an inner ring 11. Specifically, the lower annular portion 42 has a base portion 42e, an extension portion 42f, and an annular portion 42g. The base portion 42e extends in a direction in which cage bars 43 extend. The extension portion 42f further extends downward from the base portion 42e. The annular portion 42g extends radially inward from a lower end of the extension portion 42f. The lower annular portion 42 is radially and axially close to a shoulder portion 36 of the inner ring 11. The extension portion 42f and the annular portion 42g have such a shape as to extend downward to a position lower than the lower surface 11b of the inner ring 11 and further extend radially inward.

With the cage 14 illustrated in FIG. 4, as described above, when lubricating oil Q flows upward along an outer ring 12 due to the pumping action, the oil level decreases in inner spaces K1, K2, and air flows downward into the inner spaces K1, K2. The air then attempts to move to the outer ring 12 side in the lowest first bearing 10. This, however, is prevented by the lower annular portion 42 of the cage 14, which can prevent weakening of the pumping action due to the air.

In FIG. 4, the annular portion 42g of the cage 14 may be separate from the extension portion 42f, and the annular portion 42g may be assembled onto the extension portion 42f lastly in assembling the first bearing 10.

As described above, in the combination bearing 7 according to each of the foregoing embodiments, weakening of the action (pumping action) that causes the lubricating oil Q to flow upward along the outer rings 12, 22 based on rotation of the first bearing 10 and the second bearings 20 can be prevented. This allows the lubricating oil Q to be delivered to the upper second bearings 20 as well, so that lubricity can be ensured. The lubricating oil Q that has passed through the uppermost second bearing 20 is discharged above from this second bearing 20, and returns into the lubricating oil storage in the lower portion of the bearing housing 9. Specifically, the lubricating oil can be circulated throughout the combination bearing 7 by means of the pumping action in the first bearing 10 and the second bearings 20. Thus, lubricity throughout the combination bearing 7 can be ensured. As a result, the lifetime of a unit (sprinkler) including the combination bearing 7 can be improved, and the rotational resistance can be reduced.

Because weakening of the pumping action can be prevented, lubrication performance can be maintained even if the amount of the lubricating oil stored in the lower portion of the bearing housing 9 is small. Thus, the amount of the sealed-in lubricating oil can also be reduced.

The embodiments disclosed above are illustrative and non-restrictive in every respect. Specifically, the combination bearing of the present invention may adopt other embodiments within the scope of the present invention, without being limited by the illustrated embodiments. While the rolling elements are described as the balls 13 in the foregoing embodiments, the rolling elements may be implemented in another form, such as tapered rollers, for example. Even in the case of tapered roller bearings, a pumping action is induced that causes the lubricating oil to flow from one axial side toward the other axial side. In this case, a combination bearing may be provided in which a plurality of tapered roller bearings are stacked with the other axial side being the upper side in the vertical direction. As described above, the combination bearing of the present invention may have a structure in which a plurality of rolling bearings that induce a pumping action upon rotation are vertically arranged.

The number of the rolling bearings to be vertically stacked may be other than four. Moreover, the combination bearing of the present invention can also be used for applications other than a sprinkler.

In the combination bearing of the present invention, weakening of the action (pumping action) that causes the lubricating oil to flow upward along the outer rings based on rotation of the rolling bearings can be prevented. This allows the lubricating oil to be delivered to the upper rolling bearings as well, so that lubricity can be ensured.

What is claimed is:

1. A combination bearing comprising a plurality of rolling bearings stacked with their center lines extending in a vertical direction, wherein
   each of the rolling bearings has an inner ring, an outer ring, a plurality of rolling elements provided in an annular space between the inner ring and the outer ring, and an annular cage retaining the plurality of rolling elements,
   each of the rolling bearings has a structure that induces, upon rotation, an action that causes lubricating oil to flow upward along the outer ring in the annular space, and
   the cage has an upper annular portion and a lower annular portion provided adjacently above and below the rolling elements to suppress air from moving to the outer ring side from the inner ring side,
   the outer ring has, on an inner circumferential side thereof, an outer raceway, a lower shoulder portion adjacent a lower side of the outer raceway, and a diameter increasing surface that increases in diameter from an upper side of the outer raceway as it extends upward,
   the lower annular portion of the cage is positioned closer to an outer circumference face of the inner ring than the lower shoulder portion in a direction of the lower shoulder portion.

2. The combination bearing according to claim 1, wherein the lower annular portion of a lowermost rolling bearing of the rolling bearings extends downward to a position lower than a lower surface of the inner ring.

3. The combination bearing according to claim 2, wherein the cage has a plurality of cage bars that connect the upper annular portion and the lower annular portion and are inclined radially outward as the cage bars extend upward.

4. The combination bearing according to claim 3, wherein the upper annular portion of the cage has a cylindrical shape that is vertically linear.

5. The combination bearing according to claim 1, wherein the cage has a plurality of cage bars that connect the upper annular portion and the lower annular portion and are inclined radially outward as the cage bars extend upward.

6. The combination bearing according to claim 5, wherein the upper annular portion of the cage has a cylindrical shape that is vertically linear.

7. The combination bearing according to claim 1, wherein the upper annular portion of the cage has a tapered shape so as to decrease in diameter as the upper annular portion extends upward.

8. The combination bearing according to claim 1, wherein the inner ring has an upper shoulder portion that is larger in outside diameter than a lower shoulder portion, and the lower annular portion of the cage of a second lowest or higher rolling bearing of the rolling bearings faces, in the axial direction, the upper shoulder portion of the inner ring of the rolling bearing positioned under the lower annular portion, with a clearance between the lower annular portion and the upper shoulder portion.

9. The combination bearing according to claim 1, wherein the lower annular portion of the lowermost rolling bearing faces the lower surface of the inner ring.

* * * * *